United States Patent [19]

Tilgner et al.

[11] 4,399,105

[45] Aug. 16, 1983

[54] PROGRAMMABLE COMPUTER CONTROLLED REACTION INJECTION MIXING HEAD SYSTEM

[75] Inventors: Peter Tilgner, Akron; Robert D. Wingard, Kent; Shirley M. Leida, Akron; Kenneth L. Erwin, Jr., Kent, all of Ohio

[73] Assignee: The Upjohn Company, Kalamazoo, Mich.

[21] Appl. No.: 249,136

[22] Filed: Mar. 30, 1981

[51] Int. Cl.³ .................. B01F 15/02; B01F 15/04; B01J 14/00; G05D 16/00
[52] U.S. Cl. .................................. 422/111; 264/40.1; 366/137; 366/152; 366/159; 366/173; 422/112; 422/133; 422/235; 425/4 R; 425/145
[58] Field of Search ............... 422/131-138, 422/240, 242, 111, 112; 366/151, 152, 153, 159, 173, 137; 425/4 R, 145, 146; 264/40.1, DIG. 83

[56] References Cited

U.S. PATENT DOCUMENTS

| | | | |
|---|---|---|---|
| 3,788,337 | 1/1974 | Breer | 422/133 |
| 3,926,219 | 12/1975 | Ersfeld et al. | 366/173 |
| 3,960,506 | 6/1976 | Schmitzer | 137/625.4 |
| 4,092,118 | 5/1978 | Muhle | 422/242 |
| 4,096,585 | 6/1978 | Florentini | 366/159 |
| 4,126,399 | 11/1978 | Schneider et al. | 366/159 |
| 4,198,374 | 4/1980 | Arnaud et al. | 422/111 |
| 4,209,258 | 6/1980 | Oakes | 366/152 |
| 4,274,749 | 6/1981 | Lake | 366/152 |
| 4,288,230 | 9/1981 | Ebeling | 364/500 |
| 4,307,062 | 12/1981 | Wingard | 422/133 |

Primary Examiner—Michael S. Marcus
Attorney, Agent, or Firm—St. Onge Steward, Johnston & Reens

[57] ABSTRACT

Progammable computer controlled reaction injection mixing of selectively variable reactive fluid polymerizable components is disclosed, embodying an improved reactive injection mixing head construction which facilitates rapid changes in mix formulations between successive pour or molding operations in a continuing succession of such operations, while maintaining consistently uniform results in the finished products.

9 Claims, 5 Drawing Figures

PROGRAMMABLE COMPUTER CONTROLLED REACTION INJECTION MIXING HEAD SYSTEM

BACKGROUND OF THE INVENTION

1. Field of the Invention

The invention relates to systems including reaction injection mixing apparatus and computer control means associated therewith for producing polymer mixes for molding foamed or unfoamed plastic products, in which programmable control of the mixing and molding functions effected by the pumping and metering equipment involved is employed, and in which a novel design of reaction injection mixing head is utilized to improve high speed automated production of parts on commercial scale without sacrifice in maintaining given physical specifications of each molded part even though successive parts may be of different shape, size or composition.

2. Description of the Prior Art

The reaction injection mixing (RIM) heads disclosed in U.S. Pat. Nos. 4,099,919, issued July 11, 1978 and 4,070,008 issued Jan. 24, 1978, both assigned to the assignee hereof, are representative of the presently known prior art most relevant to the mixing head here disclosed. With the dictates presently made for higher production speeds and greater flexibility for changing mix formulations between successive, closely spaced, molding cycles in a continuously moving commercial molding operation, the RIM equipment heretofore available has not been completely satisfactory. It is accordingly a principal objective of the system here disclosed to provide substantially improved equipment and operational control in order better to meet the needs of modern commercial requirements.

SUMMARY OF THE INVENTION

The mixing head here described is designed particularly for use in RIM (reactive injection mixing) high-speed isocyanurate or urethane polymer molding operations. For example, it is particularly suitable in situations involving a molding cycle of 15 seconds or less between successive molds advanced to the mixing head for filling; and more particularly where it is necessary rapidly to change the formulation, size of "shot", etc. between successive molding cycles. Such conditions are encountered where the first in a series of molded products to be formed in a succession of molds advanced to the mixing head may call for a soft flexible foam, whereas the next product in the series calls for a different foam, as for example a semi or full rigid foam. It is also conceivable that a given product may require two different types of foams applied in successive operations. Automotive seats, large bumper assemblies, even full front end grills or the like are typical products currently being produced in this manner. Successive molds differing in size or shape of article to be produced is another condition that may be encountered.

The novel mixing head specifically disclosed herein as exemplary is equipped to handle up to four main reactive polymer components, plus two auxiliary components, all of which are fed at circumferentially spaced points about and into a mixing chamber in the head. Further description of this will follow. The main components consist typically of two different fluid isocyanate materials, which in the accompanying drawings are designated as ISO 1 and ISO 2, and two different fluid resin (polyol) materials, designated RESIN 1 and RESIN 2. The materials of each class, although similar, differ in their chemical, physical or other properties and are used in different combinations to produce different product mixes. In the novel mixing head here illustrated, ISO 1 and RESIN 1 are always employed in all mixes produced. Changes in the formulation are made by introducing supplemental amounts of ISO 2 and RESIN 2, singularly or in combination.

In addition to the isocyanate and polyol component streams, the system also includes the introduction of a blowing agent to produce cellular or foam structure where that form of molded product is desired. This blowing agent is usually in the form of a gas, commonly Freon R-11. A catalyst, usually an organic tin compound, is also generally used in formulating a mix to effect or expedite the polymerizing reaction. These last two components are introduced into the mix in conjunction with the main components, the tin catalyst being introduced by injection into the resin stream, while the Freon is introduced into the isocyanate stream, both injections taking place into the respective input ducts of the main components at the RIM head.

During a mix/pour (i.e., mold-filling) operation, all of the components are under high pressure (e.g. 2500 psi), and opposed jets or streams of the components enter the mixing chamber of the head on withdrawal of a close-fitting mixing head plunger or piston normally occupying that chamber. The components become thoroughly mixed by impingement of the streams in the chamber, which occurs when the lower end of the plunger is retracted above the injection ports in the mixing chamber wall, and the resulting mix flows from the chamber into a mold positioned beneth the head. The novel head may incorporate, as illustrated herein, an anti-splash cylinder/piston oriented transversely of the axis of the mixing head, which actually effects the transfer of the mix from the head to a mold.

As appears more fully below, at the conclusion of the mix/pour operation of the molding cycle, the plunger of the head is moved back into the mixing chamber, forcing all remnants of the mix into the mold (or anti-splash piston if used), and the plunger blocks entry of further components into the chamber. However, in order to maintain uniformity of the components for all molding cycles, the several components are continuously and separately recirculated between the mixing head and a storage tank in separate fluid systems, all of which are essentially similar in terms of "plumbing". Accordingly the following description of the construction and operation of one component system will serve to describe the general arrangement and operation of all of them.

Each component system incorporates a supply tank in which that component is stored. The component is drawn from the tank by a low-pressure (e.g. 40–60 psi) circulating pump which effects continuous circulation from the supply tank, through ducting to the mixing head, and back to the supply tank. The duct system incorporates in series with the head a heat exchanger for maintaining the temperature of the component at a selected level; also a filter and a high-pressure pump.

In the recycle or recirculating condition of the system, that is when there is no mixing/pouring operation involved, a by-pass around the high-pressure pump allows the component to flow at low pressure around the inactive high-pressure pump to the mixing head, then through return passages in the head, and finally back through other ducting to the supply tank. Each duct system is thus kept filled with continuously moving, temperature controlled, component.

When the high pressure (e.g. 2500 psi) pump is activated to start a mix/pour operation at the head, back-pressure created by that pump closes its by-pass valve so that the output is forced to go to the mixing head.

Each component is fed into a respective inlet/outlet block or housing of the head. A spring-loaded adjustable injector nozzle is located in this housing, having a metering pin which normally obstructs the orifice of a discharge nozzle opening onto a port of the mixing chamber in the head. In this non-mix/pour condition of operation, as mentioned above, the mixing chamber of the head is occupied by a close-fitting reciprocable control plunger which prevents injection of the component into the mixing chamber. However, the surface of the plunger is formed with return grooves running axially of it, one for each component and spaced circumferentially about its cylindrical surface, respectively communicating each injection orifice with a return port in the housing. Each return port, in turn, is connected by return ducting to its respective supply tank.

In a first or stand-by condition of the operating cycle, the low recirculating pressure (40–60 psi) is sufficient to cause the spring-loaded restricting pin of the injection nozzle to lift slightly off its seat, allowing some flow through the orifice of the nozzle into the return groove of the plunger, and back to the return duct. This enables the components to be kept continuously moving throughout each of the separate flow systems, as already mentioned, so as to maintain on-temperature supply of each component immediately adjacent the mixing chamber at all times.

In a second operating conditions of the system, constituting a condition immediately preceding a mix/pour operation, control means activate the high-pressure pumps in the respective component systems. This immediately increases each component pressure from the low recirculating pressure to the high pressure utilized for reaction injection mixing. However at this stage, the mixing head control plunger still fully occupies the mixing chamber, so the injection ports are blocked and the several component streams can not enter into mixing condition. However the increased pressure does cause further retraction of the restricting pins of the respective injection nozzles, to a position adjustably pre-fixed by screw settings. The fixed settings are selected to determine the desired metering position of the restricting pin to give a desired flow rate and hence control the amount of component admitted per unit of time when the molding operation takes place. Recirculation of the several components through the respective systems continues but obviously at a higher rate than where only the low pressure condition prevails.

In the next step of the operating cycle, the mixing head control plunger is withdrawn from the mixing chamber until the end of the plunger clears the injection ports spaced circumferentially around the cylinder wall. At this point the components are injected into the mixing chamber, all in generally the same plane, impinging upon one another to effect the desired mixing. Since the restricting or metering pin of the injection nozzle has already assumed its full metering position under the high pressure recycle condition, the system does not require further time to establish steady flow condition. Greater metering accuracy is thus achieved.

At the close of a selected time interval, preset to give the desired amount of mix, the control plunger is moved back to its starting (chamber-occupying) position, interrupting the streams of the components and causing the system to go back into high pressure recirculating condition. Return of the control plunger to its starting position also expels all residual component mixture from the mixing chamber, moving it toward the mold (or anti-splash piston) to prevent accumulation in and clogging of the mixing head.

If the time interval between mix/pour operations is long enough, the high-pressure pumps may be deactivated between cycles to save energy costs, whereupon recirculation is effected simply by the low-pressure pump. However if the time between molding operations is short, it may be more practical to run the high-pressure pumps continuously, at least while a given series of molds is being advanced past the head.

The invention is illustrated by the specific embodiment shown in the accompanying drawings.

DETAILED DESCRIPTION OF A PREFERRED EMBODIMENT

Figure 1:
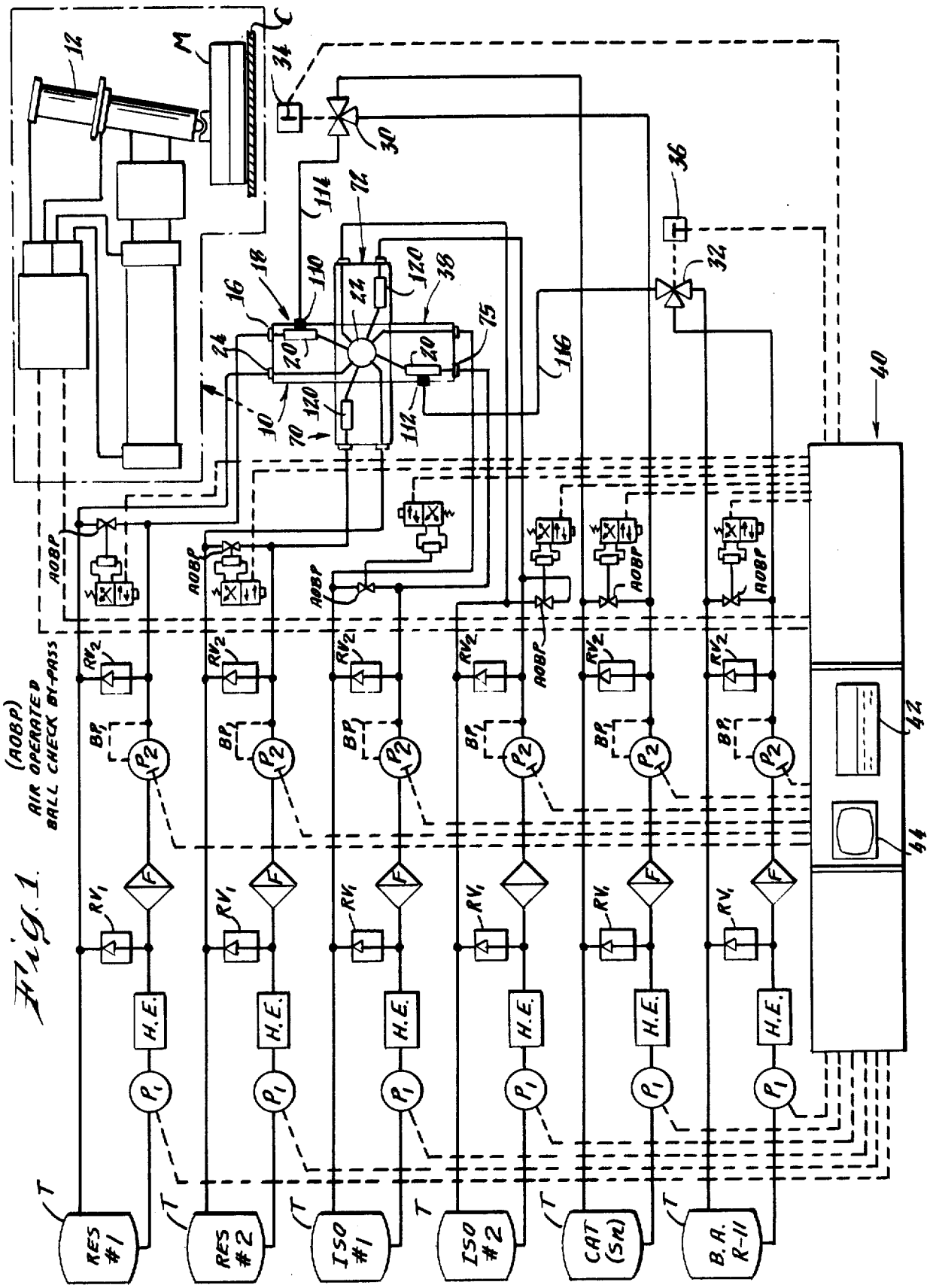
FIG. 1 is a schematic flow diagram of the component flow circuits from storage to the mixing head and return, and control means therefor, the mixing head illustration being duplicated in this view to facilitate functional as well as graphic description of it.

Referring to FIG. 1, the component flow circuit for RESIN 1 will be described in detail and it will be understood that each of the other five component systems specifically shown in this embodiment will be essentially identical except as otherwise indicated.

Mixing head 10 is shown schematically in main body of FIG. 1 as though looking at a cross-section perpendicular to the axis of the mixing chamber. A simplified pictorial representation (enclosed in broken lines) of head 10 as it actually appears is also incorporated in FIG. 1, supplementing the schematic representation and showing the head equipped with an angle pour or anti-splash cylinder 12 in superimposed filling relation to a mold M. Head 10 discharges the polymer mix into cylinder 12 which in turn transfer the mix to mold M. A series of molds is carried on an endless conveyor C for advancing each mold beneath and removing it from filling position in respect of the head.

Figure 2:
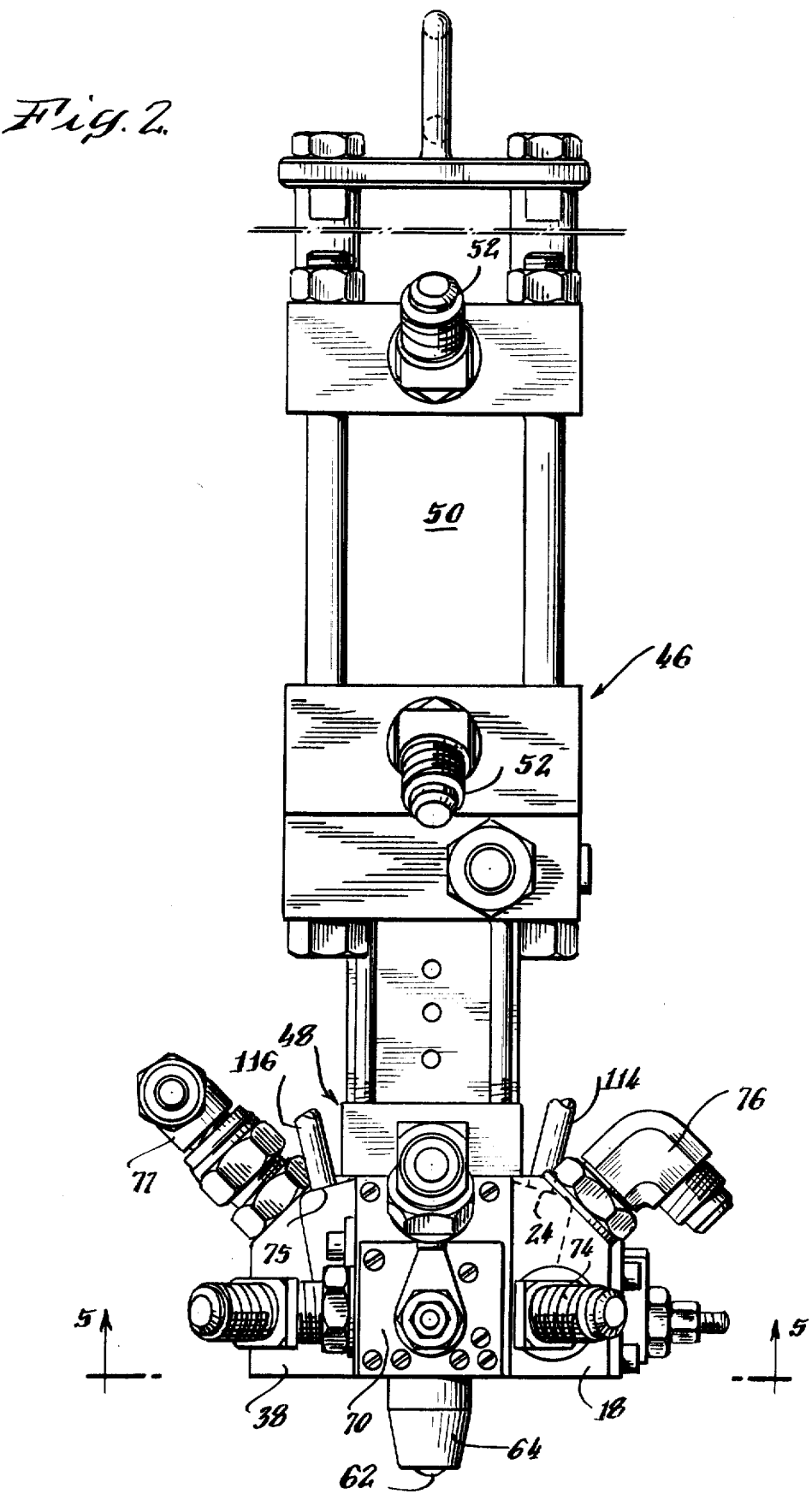
FIG. 2 is a front elevational view of the novel mixing head, parts being broken away for better clarity of understanding.
Figure 3:
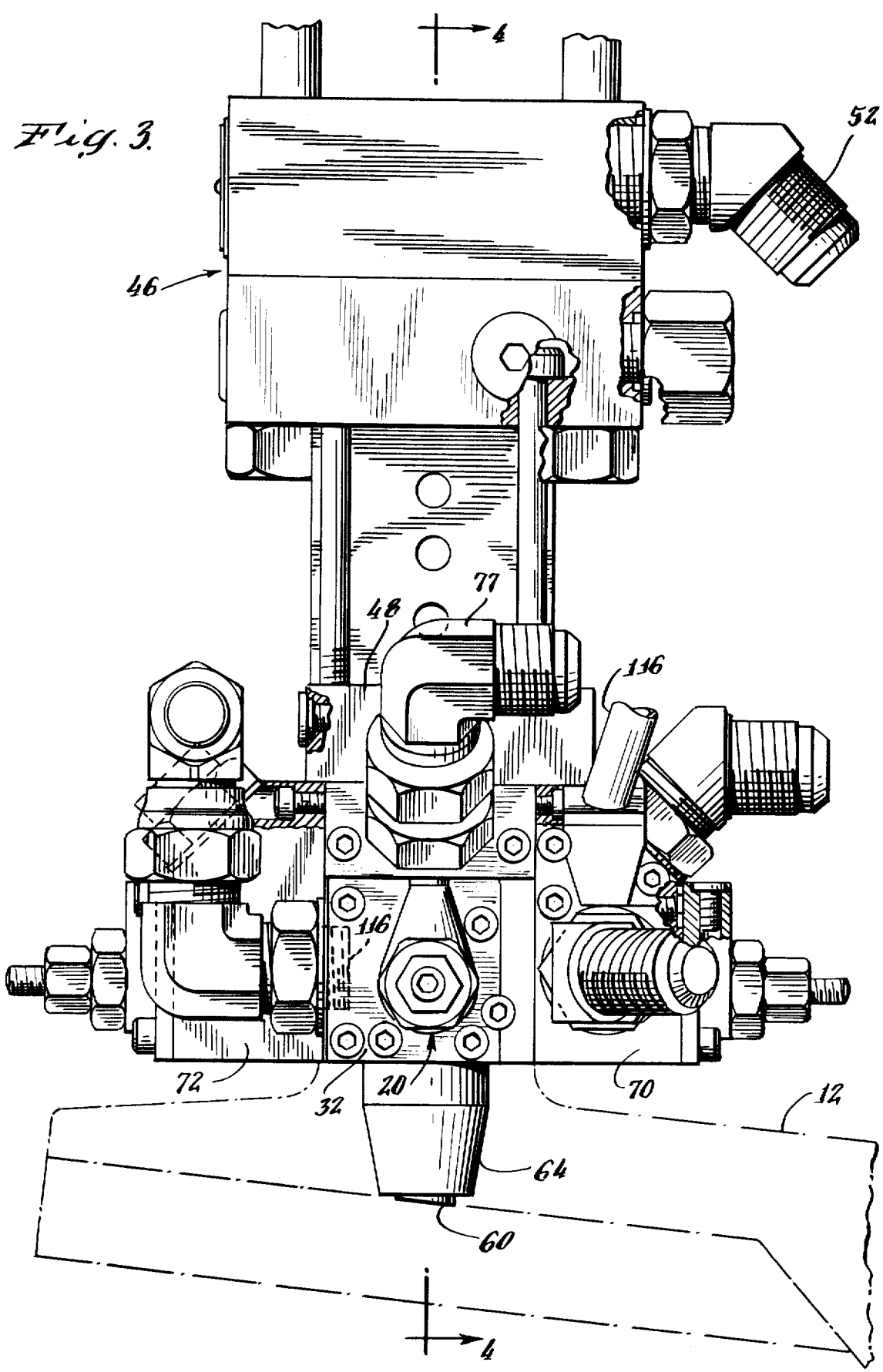
FIG. 3 is a partial view in side elevation of that head, portions being omitted or shown in broken section for simplification of illustration.

RESIN 1, which is a fluid polyol forming a main component of the mix, is drawn from its storage tank T through suitable piping by a low-pressure pump $P_1$ which transfers it through a heat exchanger HE, through filter F, to a high-pressure pump $P_2$. Low-pressure by-pass BP provides a flow passage around the high-pressure pump when the latter is not operating so that component flow to the inlet port 16 of housing or block 18 on mixing head 10 can take place under standby condition. As generally described above, the low recirculating pressure of the component is sufficient to partially open the injection nozzle 20 in block 18 (see FIGS. 2, 4), allowing some component flow through the orifice opening into the mixing chamber 22 of head 10. (See FIGS. 1 and 2) However since the control plunger of the head fully occupies chamber 22 at this time, the resin component simply flows along an axial groove provided in the periphery of the plunger and back to a tapped outlet port 24 in block 18. The resin, accordingly, does not get intermixed with other components similarly flowing in their respective circuits in this condition of the system. From outlet 24 the resin returns to supply tank T.

The component system further incorporates low-pressure and high-pressure relief valves $RV_1$, $RV_2$, respectively, which shunt the output of the pumps to the return duct when pre-set operating pressures are exceeded by those pumps.

Each of the remaining main component systems, i.e. for RESIN 2, ISO 1 and ISO 2 is mechanically identical to the RESIN 1 system just described. The flow systems for the catalyst and blowing agent are also the same, generally speaking, as that just described except that instead of leading directly into the mixing head, the pump outputs for these systems lead to three-way valves 30, 32 for the catalyst and blowing agents respectively. In the normal position of these valves, the output of the pumps is directed immediately back to the respective supply tanks; but valves 30, 32 may be shifted by their respective solenoid operators 34, 36 to close off the return and direct the pump output into the injection nozzle blocks; e.g. block 18 of RESIN 1 and block 38 of ISO 1. As will be further explained, operators 34, 36 for the catalyst and blowing agents are activated in timed relation to the retraction of the control plunger of the mixing head so that a minimum of injection of the supplemental agents into the main component streams occurs prior to actual injection of those streams into mixing chamber 22 of the head. At the close of a mix/pour cycle, the catalyst and blowing agent operators again actuate valves 30 and 32 back to the original position, cutting off further injection of those components into the main streams. This minimizes dilution or contamination of the respective main components which would occur with the return flow. If desired the auxiliary components could be introduced through separate ports to the mixing chamber, but this adds considerably to the mechanical complexity of the head.

The function of the several systems illustrated in FIG. 1 is controlled by a standard type of programmable computer which is generally designated in the drawing at 40. This incorporates means for selectively setting the high-pressure desired from high-pressure pumps $P_2$, as well as the time of flow at the selected pressure for each component during a pour cycle, in order to produce a desired volume of reactive mix for injection into a mold. Computer 40 includes standard means for producing base reference signals characteristic of the respective pressure and flow times selected for each component. Also included are sensing means associated with each of the component systems to provide signals characteristic of the pressure and flow times actually existing during the pour cycle. These sensing means send signals in the computer which are then compared with the respective base reference signals. Comparator means in computer 40 generate signals responsive to any difference existing between the signals sent back by the sensing means and the base reference signals, and corrective adjustment is made in the operation of the affected high-pressure pump so as to effect cancellation of the comparator response and ensure accuracy and consistency of the resulting mix formulation produced in the mixing chamber of the head. The electronic components for effecting the various functions just described are well-known and commercially available. A detailed description of the circuits involved in producing the aforesaid functions is accordingly omitted.

A standard terminal keyboard 42 and a video display 44 are associated with the computer 40 to permit an operator to set up a program of operation for the overall system to perform a series of molding operations, as well as to monitor actual operating parameters of the system during operation.

Figure 4:
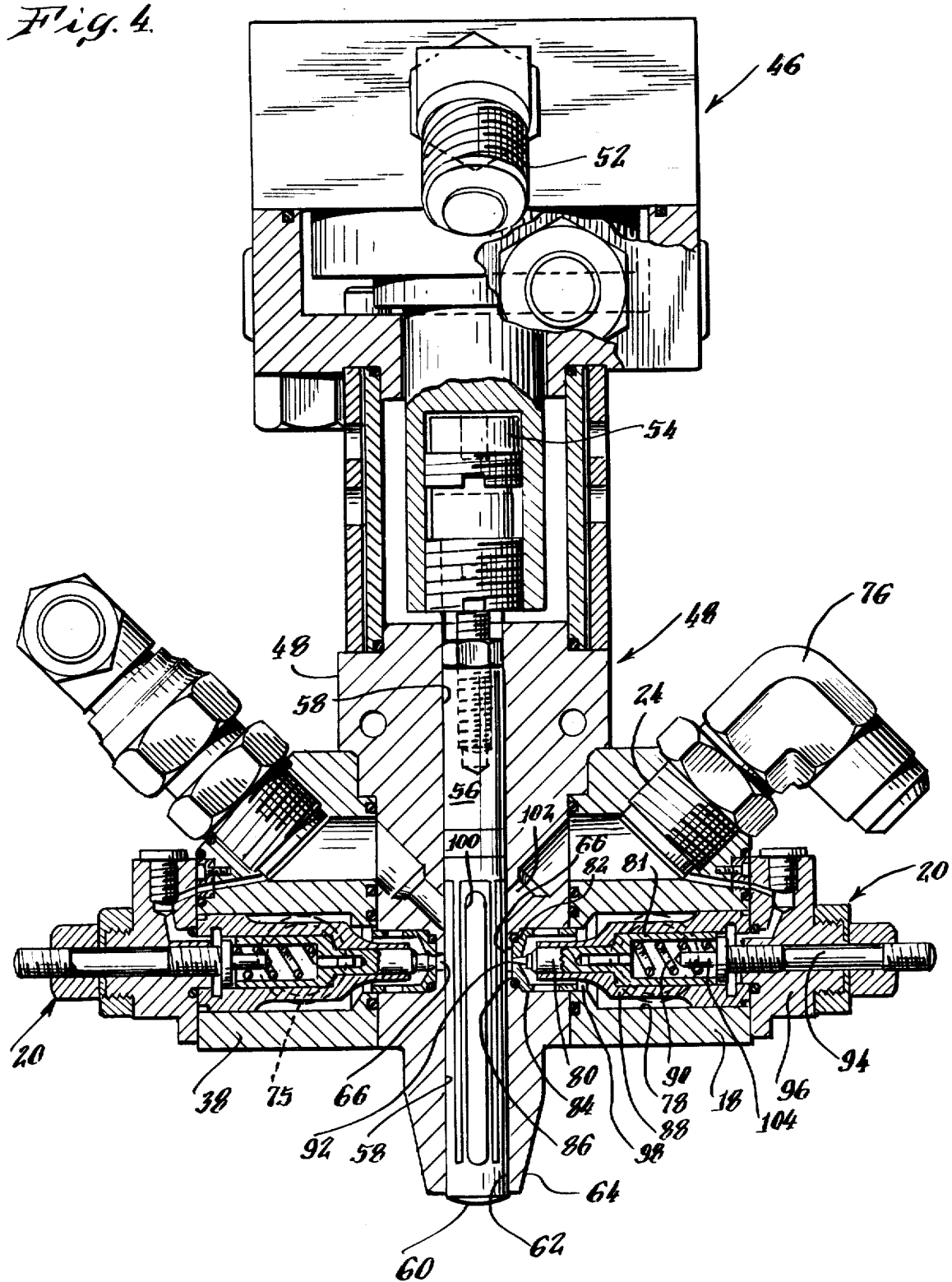
FIG. 4 is a cross-sectional view in front elevation, taken on line 4—4 of FIG. 3.

The general structure of mixing head 10 appears in more detail in FIGS. 2-5 of the drawings. This comprises an hydraulic actuator 46 superimposed on a mixing chamber body 48. Actuator 46 is a double-acting hydraulic cylinder 50 having threaded nipples 52 for introducing hydraulic fluid to opposite sides of a piston (not shown) in the cylinder in order to effect reciprocal motion of that piston. As described more fully in aforesaid U.S. Pat. No. 4,099,919 and as best seen in FIG. 4 of the accompanying drawings, the piston is connected through suitable linking elements 54 to the control plunger 56. The plunger is located in a central bore 58 extending axially through the body 48 of head 10 and defining mixing chamber 22. Control plunger 56 makes a fluid-tight sliding fit in bore 58 and is normally positioned by hydraulic actuator 46 to occupy the position shown in FIG. 4 wherein the free-end 60 of plunger 56 is coincident with the mix discharge port 62 of nozzle 64 of the head. In this position of the plunger, the mixing chamber 22 is fully occupied by the plunger.

When a mix/pour cycle of operation is desired, actuator 46 withdraws plunger 56 until its free-end 60 is raised above the plane of injection ports 66. Admission of the components through ports 66 to the mixing chamber 22 is thus permitted. Since the ports are all located in essentially the same plane, the reaction of the impinging high velocity streams causes intimate mixing of the components. When the proper amount of mix has been admitted, as determined by a preset control in computer 40, actuator 46 returns plunger 56 to its initial position. This again fully occupies mixing chamber 22 and prevents further entry of components into mixing relation with each other. The return of plunger 56 expels the mixed components through discharge port 62 of nozzle 64 into mold M, or into the chamber of anti-splash piston 12 for expulsion into a mold if the latter arrangement is employed. The return of plunger 56 also diverts each component being supplied to the head to a respective return duct to maintain circulation at the head, as mentioned previously and further explained below.

Body 48 of head 10 not only defines bore 58 but also supports the several component injector blocks peripherally about that bore. As illustrated best in FIGS. 4 and 5, injector block 18 for RESIN 1 is opposed to block 38 for ISO 1; and injector block 70 for RESIN 2 is opposed to block 72 for ISO 2, thus placing the four blocks in turret-like fashion about the axis of the bore so that the component streams enter chamber 22 in essentially a common plane.

Each of blocks 18, 38, 70 and 72 is of essentially similar construction, differing primarily in respect to details of injector conformation. The following specific description of one of the blocks will accordingly serve to provide a general understanding of all of them.

As seen in FIGS. 2-5, block 18 comprises a housing which is bolted to one face of body 48. Housing 18 has an inlet fitting, such as threaded nipple 74, secured in inlet port 16 of the housing. An outlet fitting, such as elbow 76, is received in the outlet port 24 of block 18. The respective fittings are connected by suitable flexible hydraulic lines (not shown) to the pressure and return ducts of the RESIN 1 flow system, as best seen in FIG. 1.

An injector or restrictor valve assembly 20 is received in a bore 78 of block 18 and is axially aligned with an injector nozzle port 66 of central body 48. Injector 20 includes a restrictor pin 80 having a skirt 81 axially reciprocable in the assembly and is spring-loaded in the direction of port 66. An orifice sleeve 82 is received in a counter-bore 84 of body 48 and has a central metering orifice 86 also axially aligned with port 66. Pin 80 and its skirt 81 make a piston fit in nozzle shell 88 of injector 20, and is urged by compression spring 90 to seat its needle point 92 in metering orifice 86, closing that orifice. The closing bias imparted by spring 90 is adjustable by means of a threaded stem 94 mounted in end plate 96 secured to the external face of block 18.

Fluid component entering inlet nipple 74 (inlet 16) flows into the passageway of block 18 defined by bore 78 and injector 20, passing around shell 88 and also through passages 98 between that shell and orifice sleeve 82, to a point immediately upstream of orifice 86. In the low-pressure recirculation condition of the component, the hydraulic pressure acting on the exposed face of restrictor pin 80 is sufficient to retract the pin against the bias of spring 90 sufficient only to let some fluid flow occur through orifice 86 into port 66. With the metering head control plunger 56 in the closed position as shown in FIG. 4, one of the axial recirculation grooves 100 formed in the surface of plunger 56 provides communication between port 66 and a recirculation port 102 of block 18, which port in turn communicates with outlet 24 and return elbow 76. The arrangement thus permits continuous recirculation of some component through the system at all times during the non-pour condition of the mixing head. This ensures that there is maintained at injection ports 66 a supply of reactive component of uniform viscosity, density, temperature, etc., immediately adjacent the mixing chamber for mixing with other components when a mix/pour operation is called for. This prevents trapping of even small volumes or slugs of "dead" or off-specification component at the injection port, which would otherwise be introduced at the start of a mixing cycle.

When a mixing cycle is called for, the component system pressure is raised from the low recirculation condition to the predetermined reaction injection mixing pressure by energizing the high-pressure pump. This is timed to occur prior to retraction of control plunger 56. Initially therefore there is a condition of high injection pressure in the injector chamber but only a limited flow due to bleed-off through the recirculation grooves 100 of the plunger. No component mixing, of course, yet occurs. This high system pressure causes a full retraction of the metering pin 80 of the injection nozzle to take place. The amount of retraction of point 92 of nozzle pin 80 determines the rate of component flow through metering orifice 86 during a mixing operation and the full retraction position can be adjustably set by means of stop 104 on stem 94 against which the skirt 81 of pin 80 abuts. Stop 104 is adjustable on its screw stem 94.

When plunger 56 is retracted for a mix/pour operation; i.e., by the time its free-end 60 is above the plane of injector port 66, the restrictor pin 80 is already pre-set in its previously calibrated full metering position so no lag occurs in reaching full-flow condition. That is, there is no introduction of any time delay for reaching a stable condition of full injection flow rate upon retraction of the control plunger 56, imparting to the system a capability for more accurately metering the amount of component into the mixing chamber in each cycle of operation.

Figure 5:
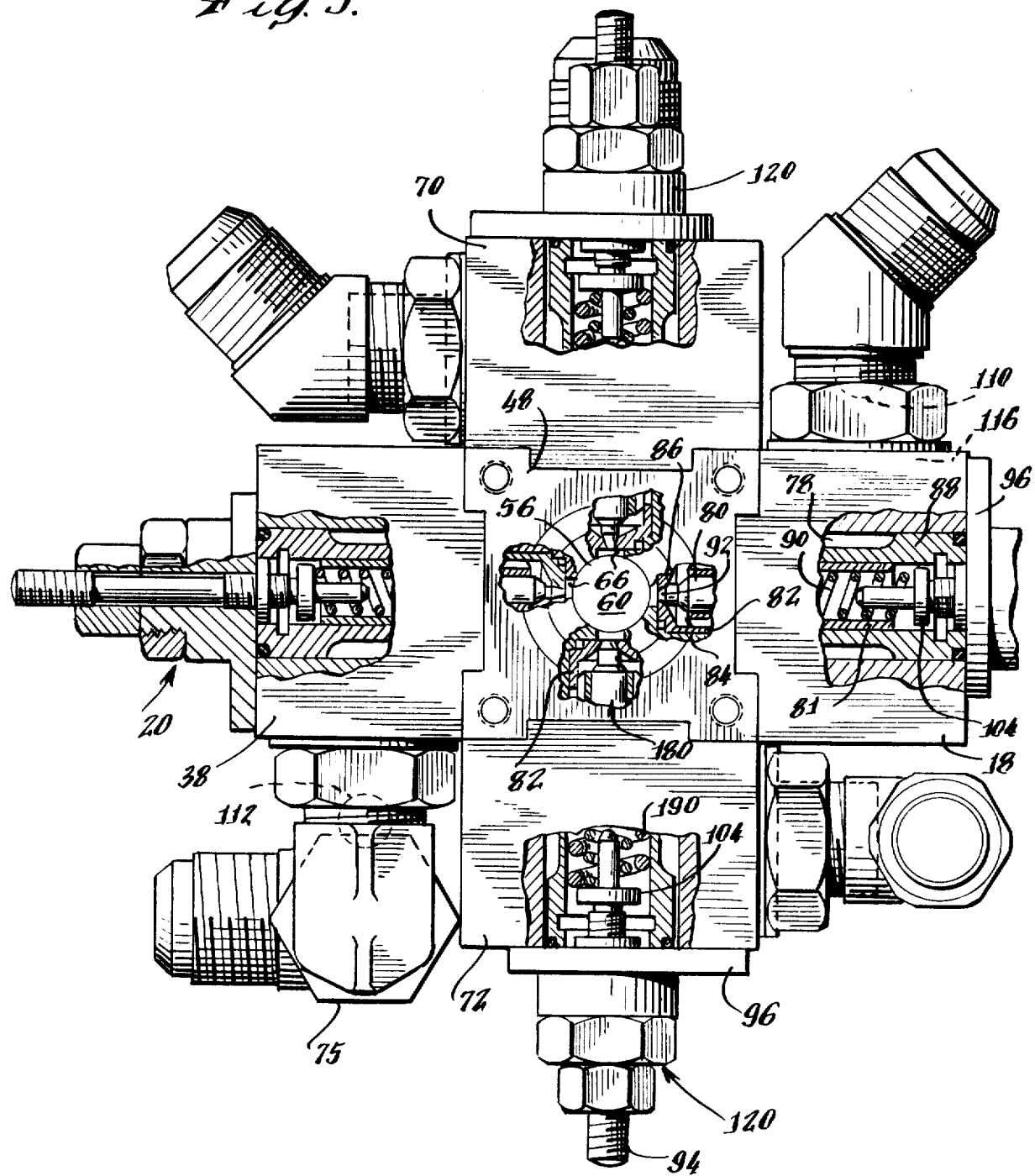
FIG. 5 is a fragmentary plan view taken on line 5—5 of FIG. 2, looking up in the direction of the arrows along the axis of the head, parts being broken away again for clarity of illustration.

In timed relation to the foregoing mix/pour cycle, actuators 34, 36 are triggered by computer 40 to flop their respective 3-way valves 30, 32 for catalyst and blowing agent from recirculating to injecting position. These components are introduced into the respective main component input lines to injector blocks 18 and 38 for RESIN 1 and ISO 1. As best seen in FIGS. 1 and 5, taps 110, 112 are provided in the respective inlet fittings 74 of injector block 18 and inlet fitting 75 of block 38 for the respective input lines 114, 116. These lines are kept short by mounting the valves on the head to reduce line volume between the 3-way valves and the respective inlet fittings. The timing of the actuation of valves 30, 32 is coordinated at the start of a mix cycle to allow for travel of catalyst and blowing agent from the valves to the respective injector blocks 18, 38 before actual injection of the main components to the mixing chamber occurs; and conversely valves 30, 32 are actuated momentarily before the end of a mix cycle to account for the auxiliary component already in lines 114, 116 downstream of their respective valves 30, 32.

At the conclusion of a pre-set mix/pour interval as determined by the computer program, plunger 56 is returned by cylinder 50 to extended position, expelling the reactive polymer mix from bore 58 and discontinuing further mixing of components. The system returns to the low pressure recirculating condition as previously described under a typical program, although this can be modified to allow for high pressure recirculation if production requirements so dictate, as described previously.

In illustrating the invention in FIG. 5, the injector assemblies 120 of injector blocks 70 and 72 incorporate modified injector pins 180 and springs 190. Pin 180 has a pilot post 105 in place of the skirt shown on pin 80, and this pilot post makes endwise contact with the opposing pilot pin of adjustable stem 94. The spring biasing arrangement differs also. These changes merely adapt the parts for different component properties and metering rates.

Although specific embodiments of the invention have been described in detail, it is to be understood that these are primarily for purposes of illustration and that modifications may be made by those skilled in the art for particular applications.

What is claimed is:

1. In a system incorporating a high pressure reaction injection mixing head for mixing selected ones of different fluid components to produce polymeric molding mixtures whose compositions may be rapidly changed between successive pour cycles in filling a series of molds, the combination of:

separate flow paths including means for storing, transporting to said mixing head and recirculating to storage each component individually and including in each separate flow path apparatus for inducing a high pressure in that component as it enters said head during a mix/pour cycle of said head;

programmable computer means for selectively presetting said high pressure and the time of flow under said pressure of each component during a mix/pour cycle, said computer including means for producing base reference signals characteristic of the respective pressure and flow time selected for each component;

component sensing means for each component producing signals characteristic of the pressure and flow times actually occurring during the mix/pour cycle;

comparator means producing signals responsive to any difference between the signals from said respective component sensing means and said base reference signals; and means sensitive to said comparator response to vary the output of said high pressure inducing apparatus so as to effect cancellation of said comparator response.

2. The system defined in claim 1, wherein each of said separate flow paths incorporates, at said mixing head, an injector assembly including an injector pin biased toward flow restricting position in said assembly but movable against said bias under influence of the component pressure away from said flow restricting position.

3. The system defined in claim 2, wherein said injector assembly incorporates stop means limiting the movement of said injector pin away from said flow restricting position.

4. The system defined in claim 3, wherein said injector assembly incorporates means for variably setting said stop means to adjust the limiting position thereof in respect to said injector pin.

5. The system defined in claim 1, wherein said mixing head incorporates:
a body defining a mixing chamber open at one end to form a discharge port, and a control plunger making a piston fit therein and being reciprocable between a component recirculating position in which it fully occupies said chamber with a free end of said plunger substantially flush with said discharge port, and a component mix/pour position in which the free end of said plunger is retracted so as to be spaced substantially from said discharge port;

component passage means in said head including inlet and outlet means, an injection port located in said passage means and opening onto said mixing chamber at a point below said plunger free end when retracted, and means in said plunger continuously communicating said injection port with said outlet means except when said plunger is fully retracted, whereby each component introduced to said mixing head is constrained to flow from its said inlet means through said injection port and plunger to said outlet means;

an injector assembly for each of several of said components, each said injector assembly being interposed in said passage means between said component inlet means and said injection port; and each said injector assembly having an injector pin and cooperating orifice means, said pin being biased normally to close said orifice but being displaceable against said bias under the influence of changing component pressure in said passage means to change the degree of restriction imposed by said pin to component flow through said orifice.

6. The system defined in claim 5, which includes means for adjustably setting the spring bias of said injector pin.

7. The system defined in claim 5, which includes stop means for limiting the displacement of said restrictor pin from said orifice closing position.

8. The system defined in claim 7, which includes means for adjustably setting said stop means.

9. A system for reaction injection mixing mixtures of at least two reactive components and capable of producing polymeric molding mixtures whose compositions can be rapidly changed between successive mix/pour cycles in filling a series of molds, comprising:

separate flow paths for each of the reactive components, each path including means for transporting from storage to a mixing head and recirculating to storage each component individually and including in each separate flow path, conduit means for transferring one component from a storage tank to a series of means including low-pressure pump means for continuously advancing said component through said conduit means, heat exchange means for heating said component, high pressure pump means for inducing a high pressure in said component for a mix/pour cycle, low-pressure by-pass means for providing a flow passage around the high pressure pump means between mix/pour cycles, and return conduit means for returning said component to storage between mix/pour cycles, a mixing head comprising (a) a body defining a mixing chamber open at one end to form a discharge port, (b) a control plunger making a piston fit in said mixing chamber and being reciprocable between a component recirculating position in which it occupies said chamber with a free end of said plunger substantially flush with said discharge port, and a component mix/pour position in which the free end of said plunger is retracted so as to be spaced substantially from said discharge port, (c) component passage means in said head for each component, each such means including inlet means, an injection assembly, an injection port, and outlet means, wherein said injection port opens into said mixing chamber at a point below said plunger free end when retracted, and said injector assembly is interposed between said component inlet means and said injection port and includes an injector pin and cooperating orifice means, said pin being biased normally to close said orifice but being displaceable against said bias under the influence of the component pressures induced by the low-pressure and high-pressure pump means to permit restricted flow of said component to said return conduit means under low pressure operation and substantially unrestricted flow to said mixing chamber during operation of the high pressure pump means for a mix/pour cycle, programmable computer means for selectively presetting said high pressure and the time of flow under said high pressure of each component during a mix/pour cycle, said computer including means for producing base reference signals characteristic of the respective pressure and flow time selected for each component;

component sensing means for each component producing signals characteristic of the pressure and flow time actually occuring during the mix/pour cycle;

comparator means for producing signals responsive to any difference between the signals from said respective component sensing means and said base reference signals; and means responsive to said comparator response to vary the output of said high pressure pump means so as to effect cancellation of said comparator response.

* * * * *